United States Patent [19]

Dayen

[11] Patent Number: 4,846,315
[45] Date of Patent: Jul. 11, 1989

[54] DEVICE FOR ENHANCING COOLING

[75] Inventor: Leonid Dayen, Plymouth, Minn.

[73] Assignee: Horton Manufacturing Co., Inc., Minneapolis, Minn.

[21] Appl. No.: 778,850

[22] Filed: Sep. 23, 1985

Related U.S. Application Data

[63] Continuation of Ser. No. 573,121, Jan. 23, 1984, Pat. No. 4,561,522.

[51] Int. Cl.$^4$ ............................................. F16D 65/84
[52] U.S. Cl. ................................. 188/264 A; 188/71.6; 192/70.12; 192/113 A
[58] Field of Search .......... 188/71.6, 264 A, 264 AA; 192/70.12, 113 A

[56] References Cited

U.S. PATENT DOCUMENTS

| | | | |
|---|---|---|---|
| 2,215,420 | 9/1940 | Eksergian | 188/264 X |
| 2,466,990 | 4/1949 | Johnson et al. | 188/264 A X |
| 2,597,603 | 5/1952 | Tack | 188/264 A |
| 3,247,934 | 4/1966 | Goode | 188/264 A |
| 3,664,467 | 5/1972 | Lucien et al. | 188/71.6 |
| 4,036,334 | 7/1977 | Brown | 188/71.6 X |

FOREIGN PATENT DOCUMENTS 1371336  10/1974  United Kingdom ........ 188/264 AA Primary Examiner—George E. A. Halvosa
Attorney, Agent, or Firm—Peterson, Wicks, Nemer & Kamrath

[57] ABSTRACT

A device for enhancing the cooling of a friction disc according to the preferred embodiment of the teachings of the present invention is shown for use with a rotational control apparatus shown in its preferred form as a brake. Due to the rotation of the friction disc, a forward flow of air is created by air flowing into entry ports into an air cooling chamber formed in the friction disc and past the periphery of the friction disc to the atmosphere. The present invention directs cooling air radially inward into the friction disc at least in one radial segment of the friction disc at a time in a direction counter to the forward flow of air to enhance the cooling of the friction disc especially at relatively low RPM. Specifically, the device of the present invention includes in its most preferred form a wire guard housing including a plurality of circular wires which are arranged in a parallel spaced relation and secured to the periphery of the external housing in which the friction disc is mounted for rotation. A squirrel cage type fan is mounted to the wire guard housing for drawing air from the atmosphere and directing it under pressure inwardly into the friction disc.

13 Claims, 3 Drawing Sheets

DEVICE FOR ENHANCING COOLING

This is a continuation of co-pending application Ser. No. 573,121 filed on Jan. 23, 1984, now U.S. Pat. No. 4,561,522.

BACKGROUND

The present invention relates generally to control apparatus and more specifically to devices for enhancing the cooling of such control apparatus, and most particularly to devices for enhancing the cooling of a friction disc, especially at relatively low RPM.

During the engagement of friction surfaces in control apparatuses such as brakes and clutches, thermal horsepower is generated which must be dissipated to allow continued operation of the control apparatus. It is then common to include fins on the friction disc to create a flow of air from adjacent the center of the friction disc and passing radially over the friction disc past the periphery of the friction disc and to the atmosphere. However, at relatively slow RPM, the rotational windage or rate of forward flow created by the rotation of the friction disc may be insufficient to dissipate the thermal horsepower generated by the control apparatus. Therefore, a need has arisen for enhancing the cooling of the friction disc especially at relatively low RPM.

SUMMARY

The device of the present invention solves this and other needs by providing a source of pressurized air located beyond the periphery of the friction disc. Cooling air from the pressurized source is directed radially inward into the friction disc in at least one radial segment of the friction disc at a time in a direction which is counter to the forward flow of air created by the rotation of the friction disc. The radial segment(s) into which the cooling air is directed is small in comparison to the circumference of the friction disc and is particularly less than 50 percent of the circumference.

Thus, it is an object of the present invention to provide a novel device for enhancing the cooling of rotational apparatus.

It is further an object of the present invention to provide such a novel device for enhancing the cooling of a rotational apparatus, including a friction disc.

It is further an object of the present invention to provide such a novel device for enhancing cooling especially at relatively low RPM.

It is further an object of the present invention to provide such a novel device which is efficient, practical, simple in construction, and relatively inexpensive.

It is further an object of the present invention to provide such a novel device which directs cooling air radially inward into the rotational apparatus in a direction counter to the forward flow of air generated by the rotation of the rotational apparatus.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
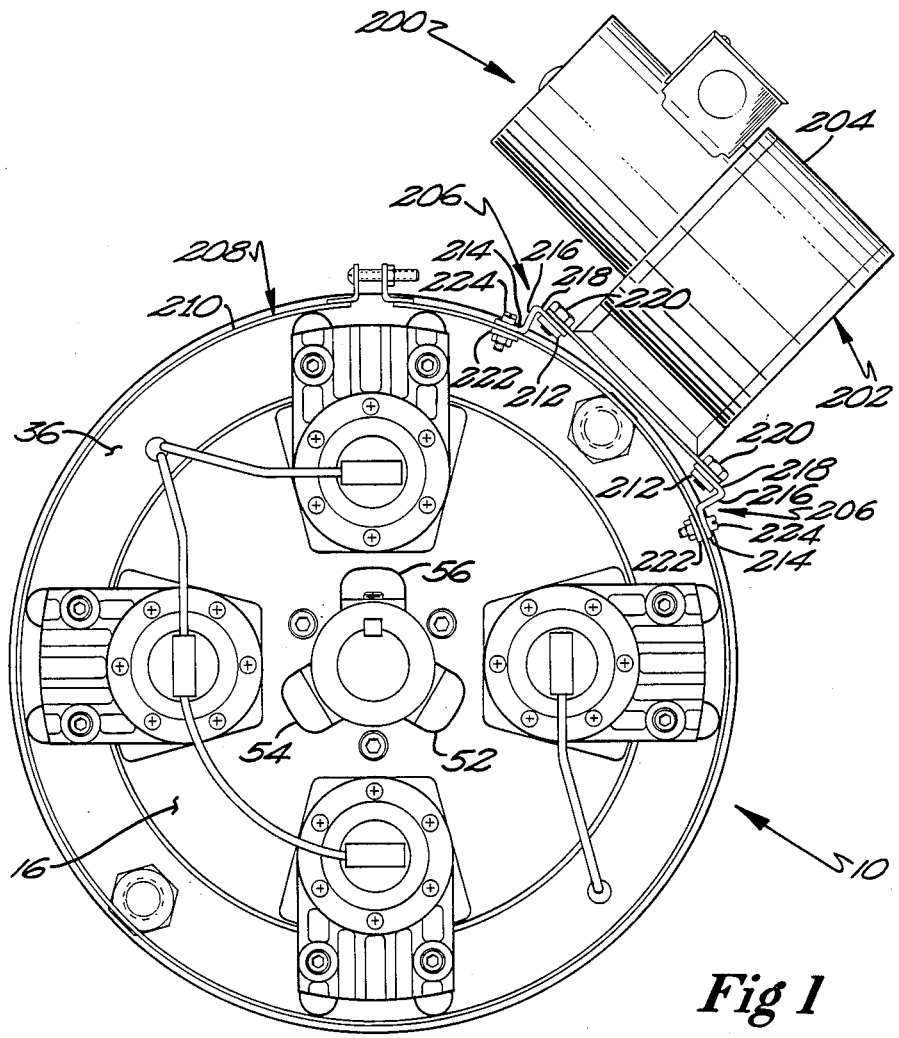
FIG. 1 shows a side view of a device for enhancing the cooling of a friction disc mounted upon a control apparatus, all constructed according to the teachings of the present invention.

All figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", and similar terms are used herein, it should be understood that these terms have reference only to the structure shown in the drawings as it would appear to a person viewing the drawings and are utilized only to facilitate describing the invention.

DESCRIPTION

A device for enhancing cooling of a control apparatus according to the teachings of the present invention is shown in the drawings and generally designated 200. In its most preferred form, device 200 is shown utilized with a control apparatus in the form of a brake 10 of the type as shown and described in U.S. patent application Ser. No. 369,327 filed Apr. 16, 1982 and entitled "Torque And/Or Rotational Control Apparatus," now U.S. Pat. No. 4,474,268 (hereinafter the "prior application") the disclosure of which is incorporated herein by reference. Generally, brake 10 includes an external housing 36 and a longitudinally centrally arranged friction disc 16. In its most preferred form in the prior application, external housing 36 is in the form of spaced rings having a circular periphery for mounting the remaining parts of brake 10. Friction disc 16 is formed in its most preferred form of the prior application from two single sided, similarly configured, component discs 40 having radially extending fins 42 projecting perpendicularly from one side of disc 40. Adjacent an inner circumference or edge of discs 40 are centrally, radially inward air entry ports 52, 54, and 56. In its most preferred form in the prior application, a cooling cavity or chamber is then formed in the friction disc 16 between intake ports 52, 54, and 56 formed adjacent the center of friction disc 16 between the inner surfaces of the first and second component discs 40 of friction disc 16, and the periphery of component discs 40. Fins 42 extend into the cooling cavity from discs 40 in an interwoven manner in a regular, alternate, overfitted, and interrelated manner. Thus, air is allowed to enter the cooling cavity through the entry ports 52, 54, and 56 and to pass in a forward flow through the air cooling chamber by a serpentine path, radially and alco circumferentially, between the first and second component discs 40, and around the heat radiating fins 42, past the periphery of the friction disc 16 and to the atmosphere. Thereby, brake 10 in the prior application has increased heat transfer, cooling and efficiency.

It should then be appreciated that device 200 can be utilized in other constructions of control apparatus than brake 10 and/or of friction discs than friction disc 16 as described in patent application Ser. No. 369,327. However, device 200 is especially adaptable to brake 10 and the advantages of its adaptation thereto will be explained as discovered in relation thereto.

Device 200 generally includes a source 202 of pressurized air which is directed radially inward into friction disc 16 of brake 10. Cooling air from source 202 is shown as directed only in one radial segment of friction disc 16 at a time. The radial segment into which the cooling air is directed includes less than 50 percent of the circumference of friction disc 16 and particularly the radial segment includes substantially less than the circumference of friction disc 16. It is believed that when air is directed only into partial of circumference of friction disc 16, the cooling air from source 202 as well as air from the forward flow created by the rotation of friction disc 16 is allowed to exit from the remaining circumference of the friction disc.

In its most preferred form, source 202 is shown as a driven fan 204, particularly a squirrel cage fan; and specifically fan model 4L446 manufactured by Dayton having a wheel diameter of 3 13/16 inches.

In its preferred form, device 200 further includes a novel member 206 for mounting fan 204 to brake 10. In its preferred form, member 206 includes a wire guard housing 208 including a plurality of circular wires 210 which are parallel and spaced from each other. Wires 210 are secured to the cylindrical shaped periphery of external housing 36 of brake 10 by suitable means. Thus, in addition to mounting fan 204, guard housing 208 helps prevent foreign objects such as fingers from being placed within brake 10 and engaging with friction disc 16.

Member 206 further includes first and second plates 212 having a width generally equal to but less than the width of housing 208 and housing 36. Plates 212 include a first leg 214, a second leg 216 extending generally perpendicular therefrom, and a third leg 218 extending from the other end of leg 216 at an angle slightly less than 90 degrees and in a direction away from leg 214. The mounting bracket of fan 204 may be secured to legs 218 of plates 212 by suitable securing members 220 such as bolts. Legs 214 of plates 212 may abut with the outside periphery of housing 208 and may be secured to a plate 222 abutting with the inside periphery of housing 208 by suitable securing members 224 such as bolts extending between wires 210 of guard 208.

It can then be appreciated that member 206 is further advantageous in that plates 212 can be utilized with any diameter of guard housing 208. Thus, for different diameters of external housings 36 of brakes 10, it is only necessary to utilize different diameters of housings 208, with all other components including fan 204, plates 212 and 222, and bolts 220 and 224, being standard and fitting all sizes of housings 208. Thus, efficiency of manufacturing and stocking is obtained by the present invention.

It should then be noted that one or more fans 204 can be provided. However, for friction discs 16 having diameters in the range of 10 to 14 inches a single fan 104 mounted at the 10 o'clock or 2 o'clock position is recommended, with the addition of further fans 104 resulting in insignificant further improvement in cooling enhancement. For example, if two fans 104 are utilized for friction disc 16 having a diameter of 14 inches, only a 5 percent increase in cooling improvement is realized over the improvement in cooling by a single fan 104. For friction discs 16 having diameters in the range of 20 inches, two fans 204 mounted at the 3 o'clock and 9 o'clock positions are recommended, with the addition of further fans 104 believed to result in similarly insignificant further improvement in cooling enhancement.

It should then be appreciated that there is a forward flow of air from the center of friction disc 16 radially outward through its periphery due to the rotational windage created by the rotation of friction disc 16. This air flow is utilized to cool friction disc 16. However, at low RPM, the rotational windage or rate of air flow created by rotation of friction disc 16 may be insufficient to dissipate the thermal horsepower of brake 10. Device 200 of the present invention then enhances cooling at lower friction disc RPM by providing forced ventilation to increase the brake thermal horsepower dissipation.

It should then be noted that, surprisingly, device 200 operates even though it directs air flow counter to the forward flow of air from friction disc 16 of the rotational windage and in an unexpected direction. Specifically, air is forced by fan 204 radially inward of friction disc 16 down and past the fins 42 of friction disc 16 and is exhausted through ports 52, 54, and 56 at slow friction disc RPM, backwards from conventional cooling. It should then be noted that as the friction disc RPM increases, the rotational windage created by friction disc 16 increases. Theoretically, at a certain point of time the air forced inward by fan 402 would meet with the forward flow of air created by rotational windage of friction disc 16 and cancel each other out. However, further unexpected result is obtained from the present invention in that an overall improvement in cooling is at times obtained through the full range of RPM. Thus, utilizing device 200 of the present invention, greater thermal horsepower ratings can be obtained than for the same brake without device 200.

Figure 5:
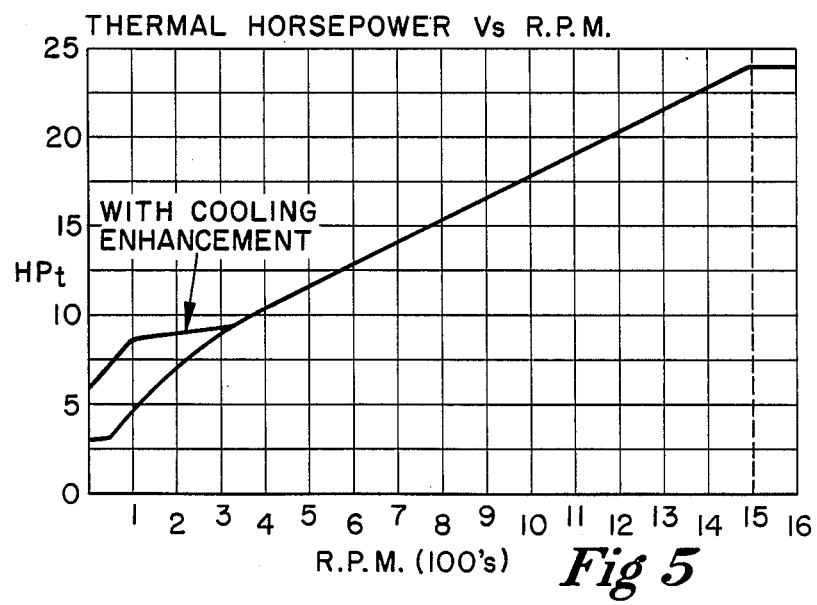
FIGS. 3-5 are graphs showing the thermal horsepower dissipation of a control apparatus with and without the cooling enhancing device of the present invention versus RPM of the friction disc.
Figure 3:
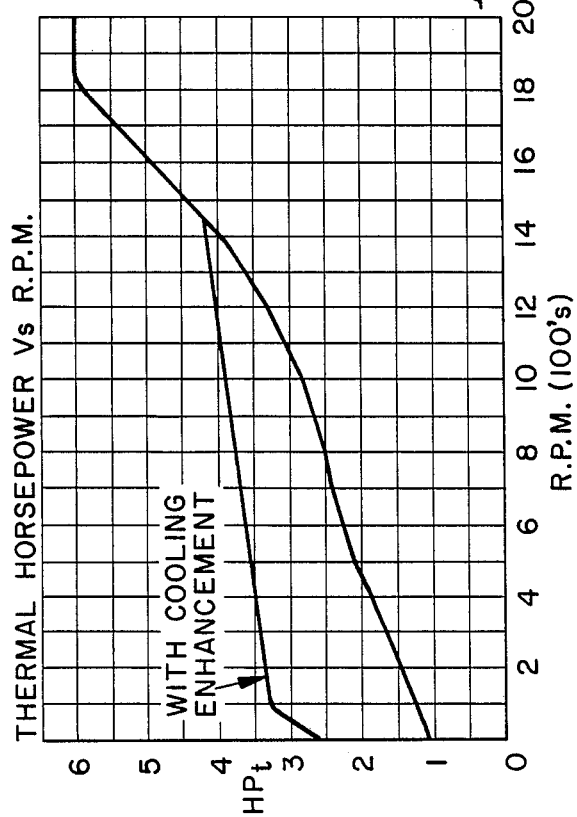
Figure 4:
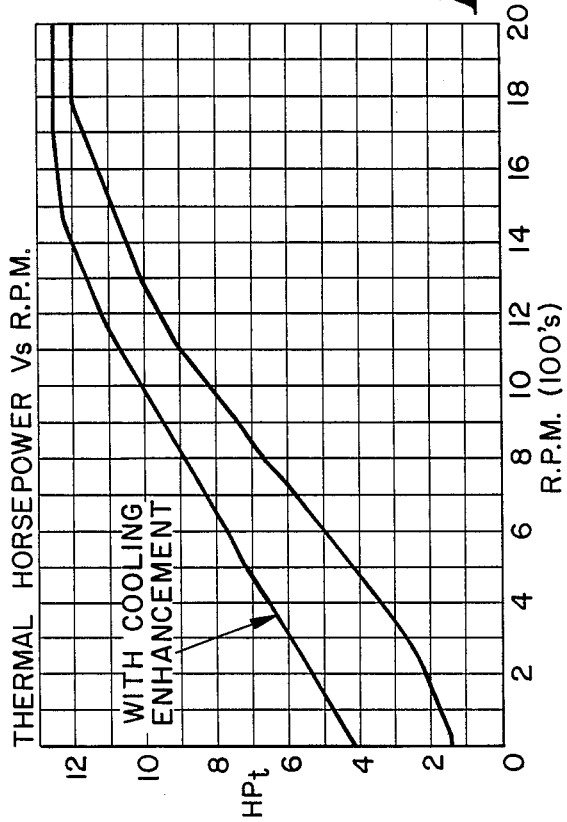
Figure 2:
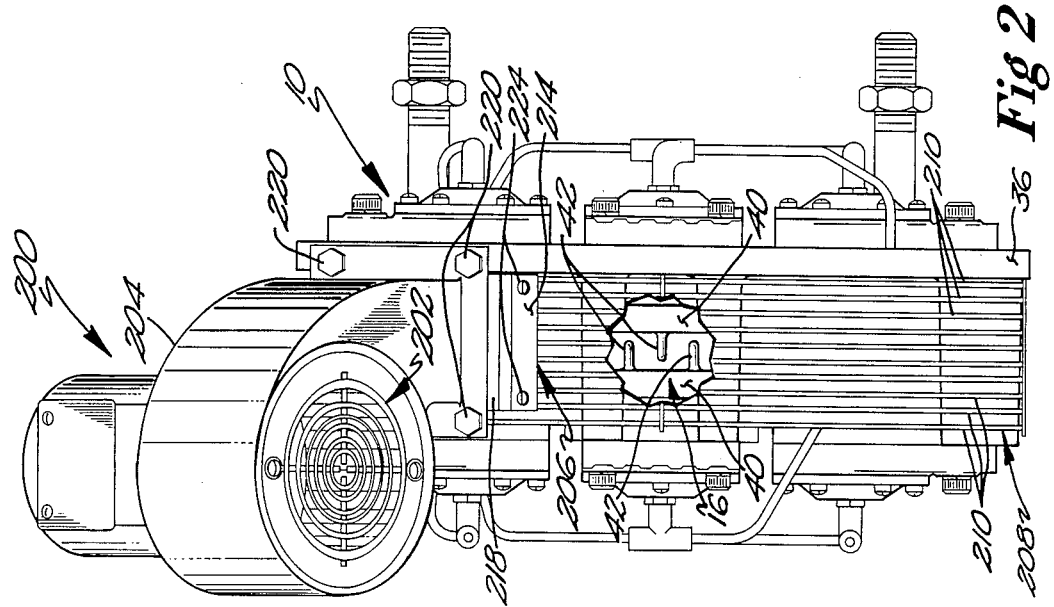
FIG. 2 shows an end view of the device of FIG. 1 with portions of the device being broken away to show the friction disc of the control apparatus.
Figure 6:
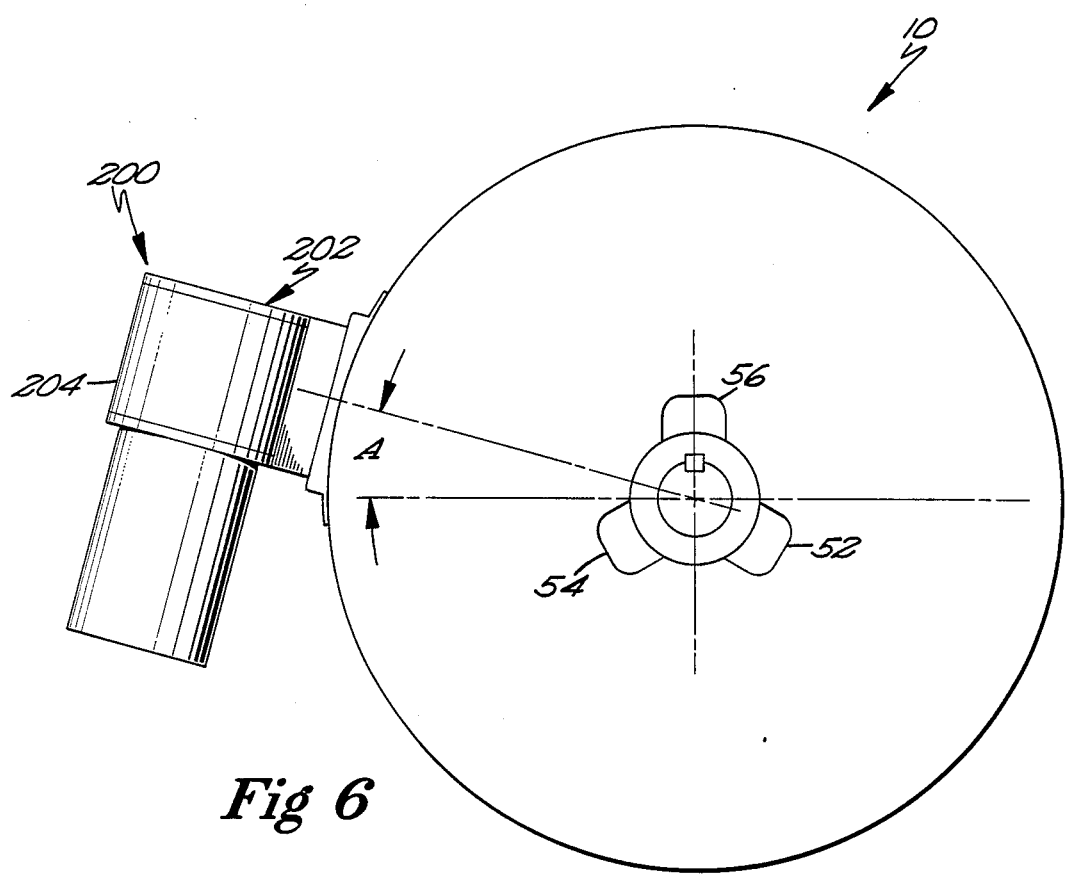
FIGS. 6 and 7 show diagramatic, side views of devices for enhancing the cooling of a friction disc mounted at preferred locations upon a control apparatus, all constructed according to the teachings of the present invention.
Figure 7:
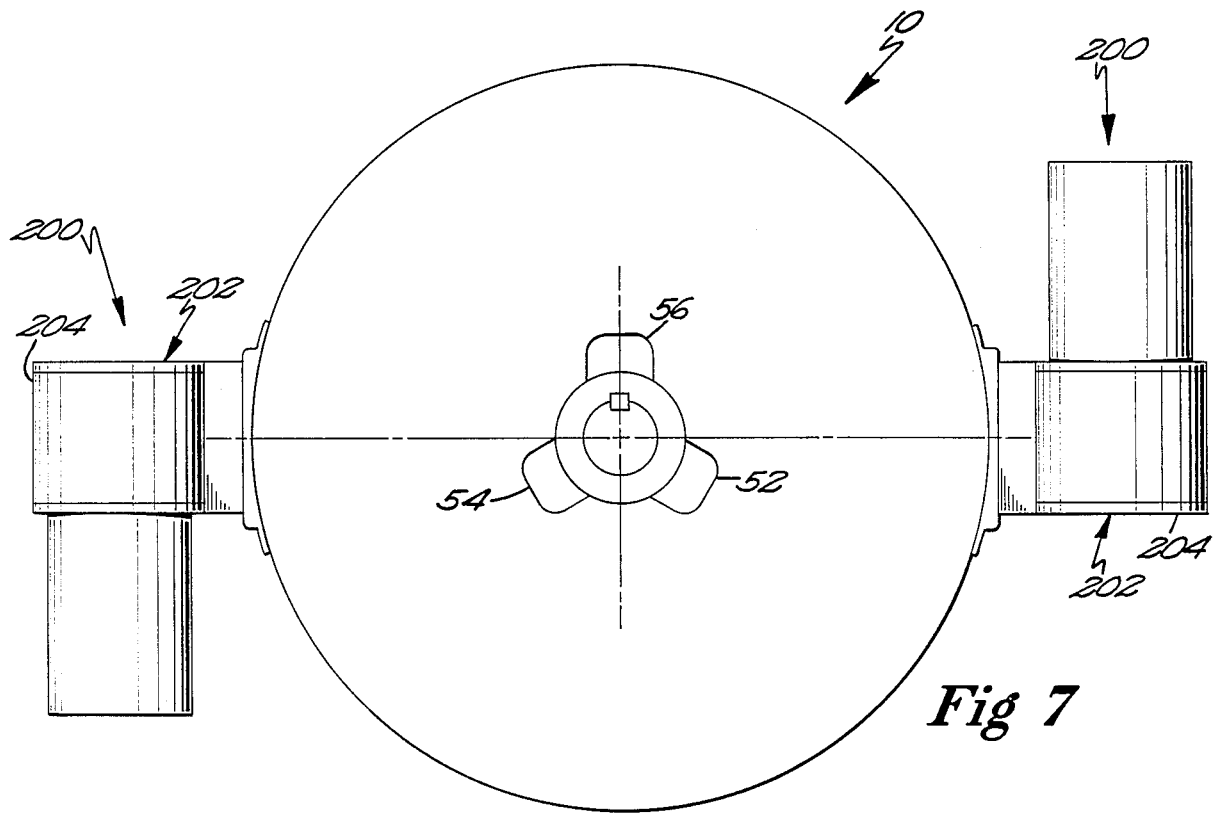

Specifically, FIG. 3 shows a graph of thermal horsepower versus RPM for a 10 inch diameter friction disc 16; FIG. 4 shows a graph of thermal horsepower versus RPM for a 14 inch diameter friction disc 16; and FIG. 5 shows a graph of thermal horsepower versus RPM for a 20 inch diameter friction disc 16, where the upper line indicates the thermal horsepower rate increases obtained with cooling enhancement device 200 according to the present invention and in the specific form set out in the drawings. It can then be appreciated that unexpected overall improved cooling is obtained through the range of low RPM.

It should then be further noted that directing the air counter to the forward flow of air from friction disc 16 has been found to be more efficient, more practical, simpler, and cheaper than attempting to force air into and through air ports 52, 54, and 56 of friction disc 16 and in the direction of the forward flow of air. For example, device 200 utilizes a squirrel cage fan 204 which is readily available, inexpensive, and easy to maintain. Likewise, drawing air from the periphery of friction disc 16 in the direction of the natural flow of air from friction disc 16 has been found to provide less advantageous results than those discovered to be obtained by device 200 of the present invention.

Now that the basic teachings of the present invention have been explained, many extensions and variations will be obvious to one having ordinary skill in the art.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for enhancing the cooling of a friction disc in a rotational control apparatus especially at relatively low friction disc RPM, with the rotational control apparatus including an external housing having a circular periphery, with the friction disc being longitudinally centrally arranged within the external housing, with the friction disc including a center and a periphery defining radial segments of a circular configuration, with rotational windage being created by the rotation of the friction disc causing a forward flow of air from adjacent the center of the friction disc and moving radially past the periphery of the friction disc to the atmosphere, with the rotational windage increasing with the rotational speed of the friction disc, with the cooling enhancing device comprising, in combination: a wire guard housing secured to the cylindrical shaped periphery of the external housing, with the wire guard housing including a plurality of circular wires which are arranged in a parallel, spaced relation; a first squirrel cage type fan apparatus for drawing air from the atmosphere and directing it under pressure; a second squirrel cage type fan apparatus for drawing air from the atmosphere and directing it under pressure; means for mounting the first squirrel cage type fan apparatus to the wire guard housing such that the air from the first squirrel cage type fan apparatus is directed radially inward towards a first radial segment of the friction disc in a direction counter to the forward flow of air; and means for mounting the second squirrel cage type fan apparatus to the wire guard housing such that the air from the second squirrel cage type fan apparatus is directed radially inward towards a second radial segment of the friction disc in a direction counter to the forward flow of air, said fan mounting means cooperating with said wires to allow circumferential adjustment of said mounting means, with the radial segments of the friction disc being small by comparison to the circumference of the periphery of the friction disc.

2. The device of claim 1 wherein the radial segment which the air from the first squirrel cage type fan apparatus is directed being at the three o'clock position, and with the radial segment which the air from the second squirrel cage type fan apparatus is directed being at the nine o'clock position.

3. The device of claim 1 wherein the radial segment includes less than 50 percent of the circumference of the friction disc.

4. The device of claim 1 wherein the friction disc includes first and second component discs, with a cooling chamber being formed between the first and second component discs, and with entry ports being formed in and through the component discs for allowing air to enter the cooling chamber adjacent the center of the friction disc and pass between the component discs beyond the periphery of the friction disc.

5. Device for enhancing the cooling of a rotational device especially at relatively low PRM, with the rotational device including a center and a periphery defining radial segments of a circular configuration, with rotational windage being created by the rotation of the rotational device causing a forward flow of air from adjacent the center of the rotational device and moving radially past the periphery of the rotational device to the atmosphere, with the rotational windage increasing with the rotational speed of the rotational device, with the cooling enhancing device comprising, in combination: a source of air under pressure greater than atmospheric, with the pressurized air source located beyond the periphery of the rotational device, with the air from the pressurized air source being directed radially inward towards the rotational device in one radial segment of the rotational device at a time in a direction counter to the forward flow of air, with the radial segment including less than 50 percent of the circumference of the rotational device allowing the cooling air from the source of pressurized air and the forward flow of air to exit past the periphery to the atmosphere from the remaining circumference of the rotational device.

6. The device of claim 5 wherein the source of pressurized air comprises at least one fan apparatus for drawing air from the atmosphere and directing it under pressure inwardly toward the rotational device against the direction of the natural flow of the rotational windage.

7. The device of claim 6 wherein the fan apparatus is of the squirrel cage type variety.

8. The device of claim 6 wherein the rotational device is rotatable within a housing, and wherein the device further comprises, in combination: means for mounting the fan apparatus to the housing allowing circumferential adjustment of the fan apparatus on the housing.

9. The device of claim 8 wherein the housing has a circular periphery, and wherein the fan mounting means comprises a wire guard housing including a plurality of circular wires which are arranged parallel and spaced from each other secured to the cylindrical shaped periphery of the housing; and means for mounting the fan apparatus to the wire guard housing, said fan mounting means cooperating with said wires to allow circumferential adjustment of said mounting means.

10. The device of claim 5 wherein the rotational device comprises a friction disc comprising, in combination: first and second component discs, with a cooling chamber being formed between the first and second component discs, and with air entry ports being formed in and through the component discs for allowing air to enter the cooling chamber adjacent the center of the friction disc and pass between the component discs beyond the periphery of the friction disc.

11. The device of claim 5 where the source of pressurized air is located at the ten o'clock or two o'clock position beyond the periphery of the rotational device.

12. The device of claim 5 further comprising, in combination: a second source of pressurized air located beyond the periphery of the rotational device and which directs cooling air radially inward toward the rotational device in one radial segment of the rotational device at a time in a direction counter to the forward flow of air.

13. The device of claim 12 wherein the first source of air is located at the three o'clock position beyond the periphery of the rotational device, and wherein the second source of pressurized air is located at the nine o'clock position beyond the periphery of the rotational device.

* * * * *